(12) United States Patent  
Danwerth

(10) Patent No.: US 8,813,639 B2  
(45) Date of Patent: Aug. 26, 2014

(54) MACHINE FOR PROCESSING FOOD PRODUCTS

(75) Inventor: Peter J. Danwerth, Steinhagen (DE)

(73) Assignee: Schröder Maschinenbau KG, Werther (DE)

( * ) Notice: Subject to any disclaimer, the term of this patent is extended or adjusted under 35 U.S.C. 154(b) by 409 days.

(21) Appl. No.: 13/201,758

(22) PCT Filed: Mar. 3, 2010

(86) PCT No.: PCT/EP2010/052726  
§ 371 (c)(1),  
(2), (4) Date: Aug. 16, 2011

(87) PCT Pub. No.: WO2010/102939  
PCT Pub. Date: Sep. 16, 2010

(65) Prior Publication Data  
US 2011/0308400 A1    Dec. 22, 2011

(30) Foreign Application Priority Data

Mar. 13, 2009    (DE) .......................... 10 2009 012 658

(51) Int. Cl.
| | |
|---|---|
| A22C 17/00 | (2006.01) |
| A23B 4/28 | (2006.01) |
| A23L 3/3589 | (2006.01) |
| A22C 9/00 | (2006.01) |
| A23L 1/318 | (2006.01) |

(52) U.S. Cl.  
CPC ............. *A22C 9/001* (2013.01); *A22C 17/0053* (2013.01); *A23L 3/3589* (2013.01); *A23L 1/318* (2013.01); *A23B 4/28* (2013.01)  
USPC .................................. 99/533; 99/532; 99/535

(58) Field of Classification Search  
USPC ........... 99/533, 532, 535, 487, 486, 494, 516; 100/73, 189, 45  
See application file for complete search history.

(56) References Cited

U.S. PATENT DOCUMENTS 3,941,230 A * 3/1976 Bellino et al. ................. 400/328  
4,453,460 A * 6/1984 Rabe et al. ....................... 100/73  
(Continued)

FOREIGN PATENT DOCUMENTS

CH    538813 A    8/1973  
DE    3034284 A1    4/1981  
(Continued)

OTHER PUBLICATIONS

Gunther Foodprocessing: "PI181/184 MC2R Vollautomatische reversier-Servo-Injektoren", May 5, 2010, pp. 1-2.

(Continued)

*Primary Examiner* — Reginald L Alexander  
(74) *Attorney, Agent, or Firm* — Richard M. Goldberg

(57) ABSTRACT

A machine for processing food products, includes a processing tool oscillatingly driven by a motor and a drive train, and a trigger system which, in each cycle of oscillating movement of the processing tool, triggers a predetermined action of the machine at a predetermined timing, the trigger system including a signal generator arranged in the drive train to deliver a reference time signal in each cycle, a timer measuring a time passed since the last occurrence of the reference time signal, and an electronic control device storing a displacement/time curve of the processing tool for at least one processing speed of the machine and in which a position of the processing tool is programmable at which the action shall be triggered, the control device determining on the basis of the displacement/time curve, the trigger timing corresponding to that position and triggering the action when the timer reaches this timing.

9 Claims, 3 Drawing Sheets

(56) References Cited

U.S. PATENT DOCUMENTS

| | | | |
|---|---|---|---|
| 5,272,964 A | * | 12/1993 | Ostergaard ................ 99/533 |
| 5,275,095 A | * | 1/1994 | Van Haren ................ 99/533 |
| 5,691,680 A | * | 11/1997 | Schrey et al. ............. 335/256 |
| 5,860,318 A | * | 1/1999 | Thomas ....................... 74/40 |

FOREIGN PATENT DOCUMENTS

| | | |
|---|---|---|
| DE | 19530044 C1 | 8/1996 |
| DE | 10105490 A1 | 8/2002 |
| EP | 0561105 A1 | 9/1993 |
| EP | 0845215 A1 | 6/1998 |
| EP | 1240827 B1 | 9/2004 |

OTHER PUBLICATIONS

Ruhle/Anonymous: Das Pokelzentrum mit 56 oder 112 Nadeln, May 5, 2010, pp. 1-4.

* cited by examiner

MACHINE FOR PROCESSING FOOD PRODUCTS

BACKGROUND OF THE INVENTION

The invention relates to a machine for processing food products, comprising a processing tool that is oscillatingly driven by a motor and a drive train, and a trigger system which triggers a predetermined action of the machine at a predetermined timing in every cycle of the oscillating movement of the processing tool.

A typical example of a machine to which the invention is applicable is a pickling machine as has been described for example in DE 195 30 044 C1. There, the processing tool is formed by a needle carrier that is equipped with a plurality of pickling needles which penetrate into the food product, e.g. meat or ham, during a descending movement of the processing tool, so that pickling brine is injected through the hollow needles into the meat. During each stroke or processing cycle of the needle carrier, certain actions have to be triggered in the machine, for example, switching on the brine injection, switching off the brine injection, or actuating a stripper which strips the meat off the needles when the latter are withdrawn.

For a machine of this type, DE 101 05 490 A1 describes an example of a conventional triggering system which is formed by an arrangement of cams and cam followers.

SUMMARY OF THE INVENTION

It is an object of the invention to provide a machine of the type described above which permits a more flexible programming of the processes to be performed in each processing cycle of the machine.

According to the invention, this object is achieved by the trigger system comprising:
- a signal generator arranged in the drive train for the processing tool and adapted to deliver a reference time signal in each cycle,
- a timer for measuring the time that has passed since the last occurrence of the reference time signal, and
- an electronic control device which has stored a displacement/time curve of the processing tool for at least one processing speed of the machine and in which a position of the processing tool is programmable at which the action is to be triggered, said control device being adapted to determine, on the basis of the displacement/time curve, the trigger timing associated with that position and to trigger the action when the timer reaches this timing.

This machine permits a particularly simple and convenient programming because the target positions at which the action in consideration is to be triggered can be input directly. For example, in case of a pickling machine, the start of a brine injection can be programmed simply by inputting the height of the needles at which the injection shall begin. This height will be dependent upon the thickness of the meat to be pickled and may directly be input into the control device of the machine without cumbersome calculations.

Typically, the movement of the oscillating processing tool is non-linear. In spite of this non-linear movement, the displacement/time curve stored in the control device permits to find, for any position of the processing tool, the timing within the related processing cycle at which the action is to be triggered, using the reference time signal as a time reference.

When the processing speed of the machine can be varied, e.g. when the stroke period of the pickling machine can be extended or shortened, the respective displacement/time curve will depend upon the selected processing speed, but this dependency can be eliminated by appropriately scaling the curve. Eventually, this means that the curve no longer describes the displacement of the processing tool directly as a function of time but rather as a function of the angular displacement of the drive motor which itself is proportional to the time, with a proportionality constant determined by the respective processing speed.

Useful embodiments of the invention are indicated in the dependent claims.

An embodiment example will now be explained in detail in conjunction with the drawings, wherein:

Figure 1:
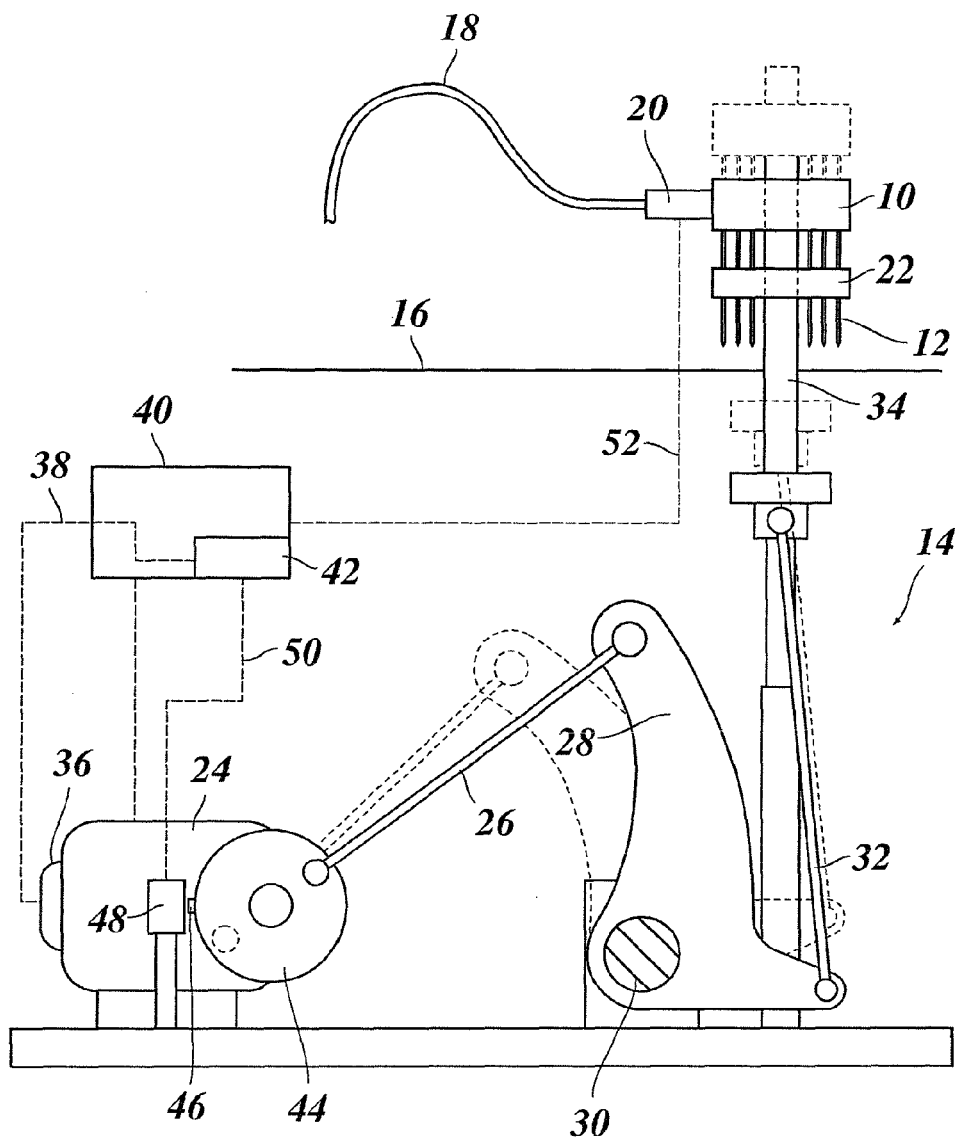
FIG. 1 shows a schematic sketch of a pickling machine according to the invention.

The pickling machine shown in FIG. 1 has, as processing tool 10, a needle carrier that is equipped with hollow needles 12. By means of a drive train 14 the processing tool may be moved oscillatingly up and down relative to a conveyer 16 on which the food products to be pickled are supplied, so that the needles 12 will penetrate into the product so as to inject pickling brine. The brine is supplied to the needles 12 via a hose 18, and the start and the end of the brine injection are controlled by a brine valve 20.

The needles 12 pass through a stripper 22 which is movable in vertical direction relative to the processing tool 10 in order to strip-off the pickled product from the needles when these are withdrawn from the product.

The drive train 14 for the processing tool comprises an electric motor 24 which drives, via a beveled gear transmission that has not been shown in detail and via a connecting rod 26, a rocker 28 that is rockable about a shaft 30. Thus, the rocker 28 is driven to oscillating pivotal movement. A leg of the rocker 28 is articulately connected, via lift rod 32, to a lift column 34 that is movable in vertical direction and on which the processing tool 10 is mounted. In this way, the oscillating pivotal movement of the rocker 28 is translated into an oscillating vertical lift movement of the processing tool 10. By changing the position of the point where the connecting rod 26 is articulated to the rocker 28, the stroke length of the processing tool may be adjusted as desired.

Associated with the rotor of the motor 24 is an angular increment sensor 36 which measures the displacement of the output shaft of the motor in small angular increments and provides a clock signal 38 representing the individual increments to an electronic control device 40. There, the clock signal 38 serves as a timer clock for an electronic timer 42.

DETAILED DESCRIPTION

Mounted on the output shaft of the transmission driven by the motor 24 is a crank disk 44 to which one end of the connecting rod 26 is articulated. Thus, one complete revolution of the crank disk 44 corresponds to a complete cycle of the lift movement of the processing tool 10. The crank disk 44 carries a mark 46 that moves past a signal generator 48 once in each revolution of the crank disk, and the signal generator 48 detects the mark 46 and provides a corresponding reference time signal 50 to the timer 42 in the electronic control device.

The angular increment sensor 36 divides the cycle period of the processing tool 10 into a number of increments that depends upon the angular resolution of the increment sensor 36 and the transmission ratio of the transmission between the motor 24 and the crank disk 44. This number determines the resolution with which each individual cycle period of the processing tool 10 can be resolved into a time succession of phases. Starting with the receipt of the respective reference time signal 50, the timer 42 counts the pulses of the clock signal 38. The count value obtained in this way indicates at any time during the cycle of the processing tool 10 in the phase that corresponds to the actual state of the processing tool.

In practice, the motor 24 will generally run at a constant speed, so that the clock signal 38 has a constant frequency and, consequently, all phases into which the cycle period of the processing tool is subdivided have the same time duration. This, however, is not compulsory for the function of the machine. The term "timer" 42 has only been selected because it is illustrative. In general, this term designates an element which counts the pulses of the clock signal 38 starting from the reference time signal 50.

In the example shown, the reference time signal 50 corresponds to the top dead center of the processing tool 10. However, this is not compulsory for the function of the machine, neither.

The control device 40 controls several components of the machine, among others the motor 24 and the brine valve 20 which receives commands for switching the brine supply on and off via a line 52. Moreover, the control device 40 controls non-shown drive sources such as pneumatic cylinders that effect the movement of the stripper 22 relative to the processing tool 10.

Figure 2:
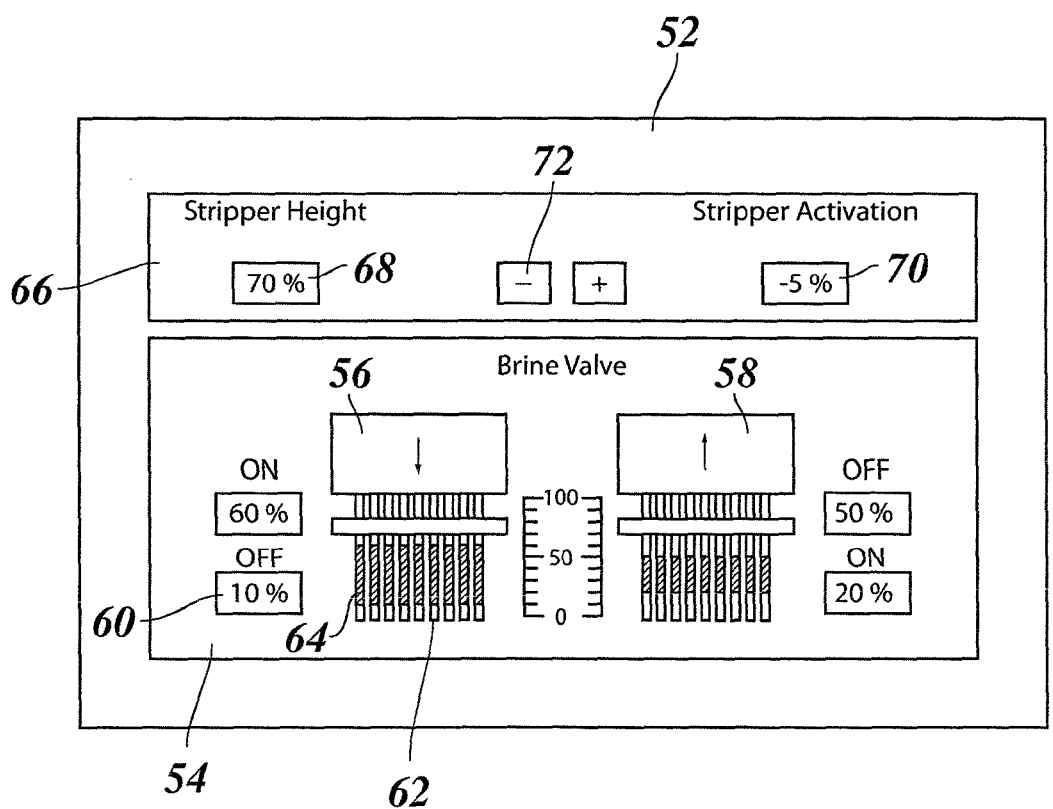
FIG. 2 shows an input template on a screen of an operating unit for the pickling machine shown in FIG. 1.

FIG. 2 illustrates an input template 52 that is displayed on a screen of an operating unit belonging to the electronic control device 40, which template permits to program the pickling machine. In particular, the input template 52 serves for determining the positions of the needles 12 at which the injection of brine shall start and stop. These positions may be selected independently from one another for the upward stroke and the downward stroke of the processing tool. Accordingly, the input template 52 includes, in a field 54 serving for programming the brine valve, two symbolic representations 56, 58 of the needle carrier. The representation 56 relates to the downward stroke and the representation 58 to the upward stroke. Associated with each of these representations are two digital displays 60 designated as "ON" and "OFF" and indicating the positions at which the brine injection starts and stops, respectively. The position of the needles is given here in terms of a percentage and designates the height of the lower tips of the needles relative to the entire stroke length of the processing tool 10. Thus, the percentage value "0%" corresponds to the position of the needle tips at the bottom dead center, and the percentage value "100%" corresponds to the position of the needle tips at the top dead center. Optionally, it would also be possible to indicate the absolute height of the needles in millimeters, and instead of the bottom dead center, the surface of the conveyer 16 might also be used as a height reference.

In the representations 56 and 58 the strokes of the needles are symbolically shown as bars 62, and within each of these bars the time duration in which the brine injection is active is designated by a color-highlighted area 64. The position of the stripper 22 is also indicated symbolically.

A field 66 in the input template 52 permits also to program the operation of the stripper 22. A digital display 68 indicates the actually selected height of the stripper (again as a percentage in relation to the entire stroke length of the processing tool 10). For example, the value "70%" for the height of the stripper means that the distance from the stripper to the tips of the needles amounts to 70% of the stroke length in which the processing tool 10 and the stripper 22 move together and the needles inject to the product to be pickled.

When the needles are withdrawn from the product during an upward stroke of the processing tool 10, the product has the tendency to stick to the needles. For this reason, the drive source for the stripper 22 is activated at a suitable timing, so that the stripper will move downwardly relative to the processing tool 10 in order to strip the product off the needles. A digital display 70 in the field 66 indicates the point where the stripper is activated. In the example shown, the value "–5%" means that the stripper is activated when the needles are in a position 5% away from the bottom dead center.

In the example shown, the screen on which the input template 52 is displayed is a touch screen on which the parameter the setting of which shall be changed can be selected by tipping onto the respective digital display 60, 68 or 70. Then, plus and minus keys 72 permit to increment or decrement the selected parameter in suitable steps.

Figure 3:
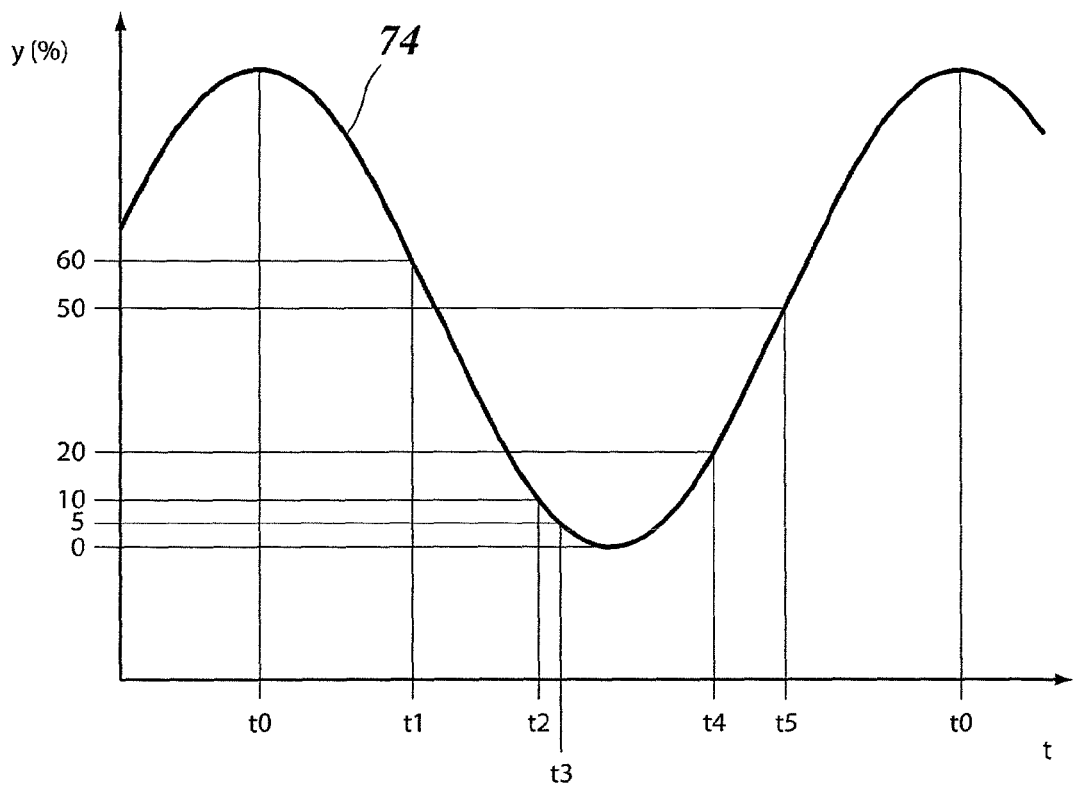
FIG. 3 shows an example for the programming of processes in the pickling machine on the basis of a displacement/time curve.

FIG. 3 illustrates a displacement/time curve 74 for the processing tool 10. This curve is stored in the control device 40 in electronic form and has the purpose to transform the positions for switching on and off the brine supply and activating the stripper, as input in the template 52, into corresponding trigger timings. For example, the displacement/time curve may be stored in the form of a table.

As a result of the oscillating movement of the processing tool 10 the curve 74 resembles a sinusoidal curve. However, due to the construction of the drive train as shown in FIG. 1, it is not an exact sine curve. For a given machine, the curve may be recorded empirically, for example by means of the software that is implemented in the control device 40 itself. On the y-axis in FIG. 3, the positions of the tips of the needles 12 are indicated (as percentages), and on the t-axis, the corresponding trigger timings are indicated in units of increments of the angular increment sensor 36. At the time t0 the reference time signal 50 is received and a new cycle T of the processing tool begins. At this time, the timer 42 is reset and started.

In FIG. 2, the needle position 60% has been indicated for the start of the brine injection during the downward stroke. The curve 74 in FIG. 3 provides the corresponding trigger timing t1. When the timer 42 reaches the value t1, the related action, i.e. switching on the brine valve 20, is triggered. Similarly, the brine valve is switched off again at the timing t2. The stripper 22 is activated at the timing t3. The timings t4 and t5 mark the beginning and the end of the second brine injection during the upward stroke of the needles.

In this way, the processes in the pickling machine can be programmed and controlled in a very easy, convenient and reliable way.

Since the time t is counted in increments of the angular increment sensor 36, the programming does not need to be changed when the speed of the motor 24 is changed. Since the y-positions of the needles are given as a percentage of the entire stroke length, the programming does not need to be changed, neither, when the total stroke of the processing tool 10 is changed by selecting another articulation point between the connecting rod 26 and the crank disk 44.

As is illustrated by the example shown in FIGS. 2 and 3, the machine provides in particular the advantageous possibility to program a plurality of brine injection phases within a single cycle T, e.g. one injection phase during the downward stroke and another during the upward stroke. This is particularly advantageous when the product to be pickled is, for example ham having a crust, disposed on the conveyer with the crust facing toward the conveyer. By interrupting the brine injection in the vicinity of the bottom dead center of the needles 12, an undesired accumulation of brine above the crust can be avoided. By suitably selecting the duration of the injection phase or injection phases the total amount of brine being injected can be adapted to the actual requirements.

The invention claimed is:

1. A machine for processing food products, comprising:
a processing tool that is oscillatingly driven by a motor and a drive train, and
a trigger system which, in each cycle of the oscillating movement of the processing tool, triggers a predetermined action of the machine at a predetermined timing, the trigger system including:
a signal generator arranged in the drive train for the processing tool and adapted to deliver a reference time signal in each cycle,
a timer for measuring a time that has passed since the last occurrence of the reference time signal, and
an electronic control device which stores a displacement/time curve of the processing tool for at least one processing speed of the machine and in which a position of the processing tool is programmable at which the action shall be triggered, the control device being adapted to determine, on the basis of the displacement/time curve, the trigger timing corresponding to that position and to trigger the action when the timer reaches this timing, wherein the control device is adapted to generate, on a screen, an input template in which the positions of the processing tool belonging to the trigger timings are adapted to be input.

2. The machine according to claim 1, wherein the drive train includes a crank connecting rod.

3. The machine according to claim 1, wherein the drive train is adapted to be adjusted mechanically in order to change an entire stroke length of the processing tool, and wherein the position of the processing tool is adapted to be input at the input template as a percentage of a total stroke length.

4. The machine according to claim 1, wherein the processing tool is a needle carrier having needles for injecting pickling brine into the food products.

5. The machine according to claim 4, wherein a supply of the brine to the needles is adapted to be switched on and off, and wherein the actions triggered by the control device comprise actions of switching on and off the brine supply within each cycle.

6. A machine for processing food products, comprising:
a processing tool that is oscillatingly driven by a motor and a drive train, and
a trigger system which, in each cycle of the oscillating movement of the processing tool, triggers a predetermined action of the machine at a predetermined timing, the trigger system including:
a signal generator arranged in the drive train for the processing tool and adapted to deliver a reference time signal in each cycle,
a timer for measuring a time that has passed since the last occurrence of the reference time signal, and
an electronic control device which stores a displacement/time curve of the processing tool for at least one processing speed of the machine and in which a position of the processing tool is programmable at which the action shall be triggered, the control device being adapted to determine, on the basis of the displacement/time curve, the trigger timing corresponding to that position and to trigger the action when the timer reaches this timing,
wherein the motor has an angular increment sensor for generating a clock signal for the timer.

7. A machine for processing food products, comprising:
a processing tool that is oscillatingly driven by a motor and a drive train, wherein the processing tool is a needle carrier having needles for injecting pickling brine into the food products, and
a trigger system which, in each cycle of the oscillating movement of the processing tool, triggers a predetermined action of the machine at a predetermined timing, the trigger system including:
a signal generator arranged in the drive train for the processing tool and adapted to deliver a reference time signal in each cycle,
a timer for measuring a time that has passed since the last occurrence of the reference time signal, and
an electronic control device which stores a displacement/time curve of the processing tool for at least one processing speed of the machine and in which a position of the processing tool is programmable at which the action shall be triggered, the control device being adapted to determine, on the basis of the displacement/time curve, the trigger timing corresponding to that position and to trigger the action when the timer reaches this timing,
wherein a supply of the brine to the needles is adapted to be switched on and off, and wherein the actions triggered by the control device comprise actions of switching on and off the brine supply within each cycle, and
wherein the control device is adapted for programming, in each cycle at least two injection phases separated by a time gap.

8. A machine for processing food products, comprising:
a processing tool that is oscillatingly driven by a motor and a drive train, wherein the processing tool is a needle carrier having needles for injecting pickling brine into the food products, and
a trigger system which, in each cycle of the oscillating movement of the processing tool, triggers a predetermined action of the machine at a predetermined timing, the trigger system including:
a signal generator arranged in the drive train for the processing tool and adapted to deliver a reference time signal in each cycle,
a timer for measuring a time that has passed since the last occurrence of the reference time signal, and
an electronic control device which stores a displacement/time curve of the processing tool for at least one processing speed of the machine and in which a position of the processing tool is programmable at which the action shall be triggered, the control device being adapted to determine, on the basis of the displacement/time curve, the trigger timing corresponding to that position and to trigger the action when the timer reaches this timing,
wherein a supply of the brine to the needles is adapted to be switched on and off, and wherein the actions triggered by the control device comprise actions of switching on and off the brine supply within each cycle, and
wherein the control device is adapted for graphically displaying, in an input template, at least one injection phase in which brine is injected.

9. A machine for processing food products, comprising:
a processing tool that is oscillatingly driven by a motor and a drive train, wherein the processing tool is a needle carrier having needles for injecting pickling brine into the food products, and
a trigger system which, in each cycle of the oscillating movement of the processing tool, triggers a predetermined action of the machine at a predetermined timing, the trigger system including:
a signal generator arranged in the drive train for the processing tool and adapted to deliver a reference time signal in each cycle,
a timer for measuring a time that has passed since the last occurrence of the reference time signal, and
an electronic control device which stores a displacement/time curve of the processing tool for at least one processing speed of the machine and in which a position of the processing tool is programmable at which the action shall be triggered, the control device being adapted to determine, on the basis of the displacement/time curve, the trigger timing corresponding to that position and to trigger the action when the timer reaches this timing, and
wherein the processing tool has associated therewith a stripper that is actively driven to move relative to the processing tool, and one action triggered by the control device is activation of a drive source for the stripper.

* * * * *